April 9, 1940.  E. F. LOWEKE  2,196,337

FLEXIBLE CUP

Filed Jan. 8, 1937

INVENTOR.
ERWIN F. LOWEKE
BY Williams, Bradbury, McCaleb & Hinkle
ATTORNEYS

Patented Apr. 9, 1940

2,196,337

UNITED STATES PATENT OFFICE 2,196,337

FLEXIBLE CUP

Erwin F. Loweke, Detroit, Mich., assignor to Hydraulic Brake Company, Detroit, Mich., a corporation of California Application January 8, 1937, Serial No. 119,675

1 Claim. (Cl. 309—33)

This invention relates to a flexible cup for sealing relatively movable parts.

Broadly the invention comprehends a flexible cup made of rubber or other suitable material for use in connection with a piston movable in a cylinder to provide against seepage of fluid from the cylinder past the piston.

A major object of the invention is to provide a flexible cup having a flange inclined outwardly from the base of the cup so that when the base is expanded due to pressure thereon the end of the flange and margin of the base will be substantially in the same plane so as to effect a satisfactory seal between a piston and a cylinder in connection with which the cup is used.

Other objects and advantages of the invention will more fully appear from the following description taken in connection with the accompanying drawing forming a part of this specification, and in which, Fig. 1 is a side elevation partly in section of a fluid pressure producing device illustrating the invention as applied;

Figure 1:
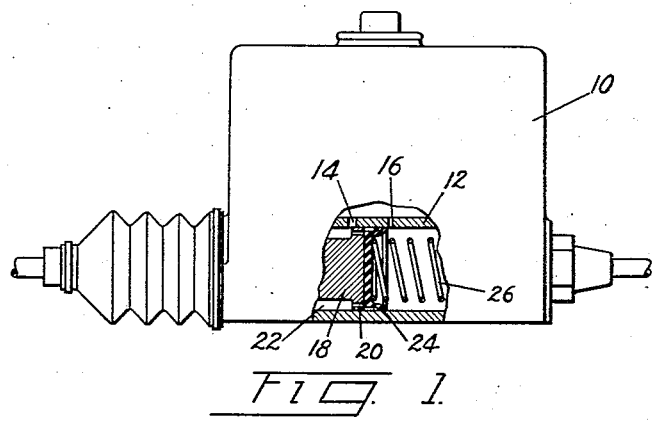
Figure 2:
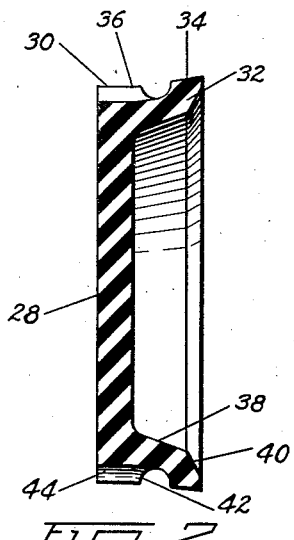
Fig. 2 is a diametral cross-sectional view of the cup.
Figure 3:
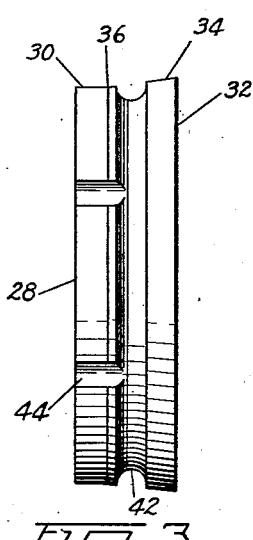
Fig. 3 is a side view of the cup.

Referring to the drawing, 10 represents a fluid reservoir having therein a cylinder 12 provided with ports 14 and 16 communicating with the reservoir. A piston 18 reciprocable in the cylinder has a plurality of spaced ports 20 in its head for the passage of fluid from a chamber 22 back of the head of the piston to that portion of the cylinder forward of the piston, and seated on the head of the piston is a flexible cup 24 held against displacement by a spring 26.

The cup is made of rubber or other suitable flexible material. The base 28 thereof has a uniform thickness. It is disc-shaped or circular in contour and the periphery or margin 30 is normal or at right angles to the bottom and top surfaces of the base. Preferably the diameter of the base is slightly less than the diameter of the piston and the inner diameter of the cylinder in connection with which the cup is used. This is of major importance because of the radial expansion of the base when the cup is subjected to pressure.

In practice, it has been found that in instances where the diameter of the cup is equal to the diameter of the piston, in connection with which the cup is used, the cup invariably binds in the cylinder; whereas when the diameter of the cup is slightly less than the diameter of the piston, the base of the cup when subjected to pressure is invariably expanded sufficiently to fit the cylinder snugly.

A marginal flange 32 formed integral with the base 28 is flared outwardly, and its outer wall or surface 34 forms at its junction with the margin 30 of the base 28 an obtuse angle 36. This angle completely disappears when the base is subjected to pressure, as in the normal use of the cup, to the end that the cup uniformly fits the cylinder in which it is used. The base of the flange 32 is in a plane with the top surface of the base 28 of the cup. This portion of the flange is of substantial thickness, and the inner wall or surface 38 of the flange inclines toward the outer wall or surface 34 of the flange to lend flexibility to the flange; and the lip or edge of the flange is beveled, as indicated at 40, so as more effectively to engage the wall of the cylinder and inhibit engagement between the edge of the flange and the conventional retaining spring 26 generally seated in the bottom of the cup.

In the preferred embodiment of the invention, illustrated in Figs. 1 to 4, the flange 32 has an annular groove 42 adjacent the junction of the flange and the base 28, and a plurality of axial grooves 44 extend from this annular portion through the base 28. These grooves facilitate the passage of fluid from the chamber 22 back of the head of the piston, through the passages or ports 20 in the head of the piston, and past the cup into that portion of the cylinder 12 forward of the piston during the retraction stroke of the piston. The groove 42 also lends flexibility to the flange so that when the cup is subjected to pressure, as on the compression stroke of the piston, the flange may more effectively engage the wall of the cylinder so as to inhibit the escape of fluid past the piston.

Figure 5:
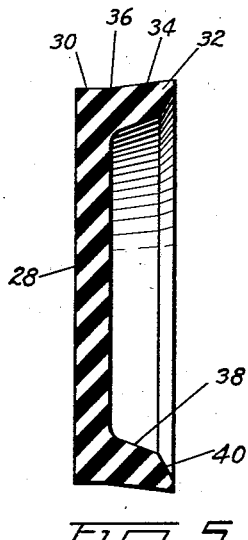
Fig. 5 is a diametral cross-sectional view of a modified form of the cup.
Figure 4:
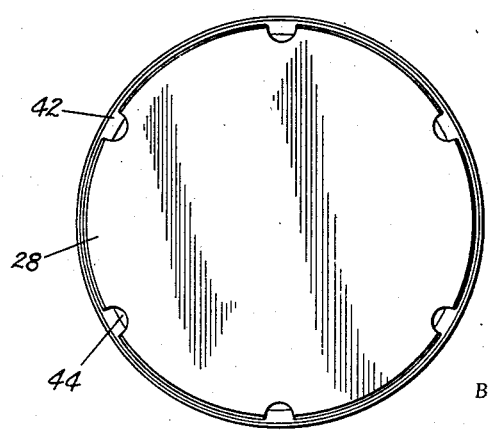
Fig. 4 is a bottom plan view of the cup.

In the modified form of the invention illustrated in Fig. 5, the grooves have been deleted. This type of cup has been found desirable in instances where the passage of fluid past the cup on the retraction stroke of the piston, in connection with which the cup is used, is non-essential.

Although this invention has been described in connection with certain specific embodiments, the principles involved are susceptible of numerous other applications that will readily occur to persons skilled in the art. The invention is, therefore, to be limited only by the scope of the appended claim.

Having thus described the various features of the invention, what I claim as new and desire to secure by Letters Patent is,

A flexible cup comprising a flat circular base adapted to contact a supporting member and a flange extending from said base and adapted to form a seal with a cylindrical surface, said base having a normal diameter smaller than the diameter of said cylindrical surface, said base being expansible under fluid pressure whereby said base is adapted to be expanded into contact with said cylindrical surface, said flange being inclined radially outward with respect to the periphery of said base and having a free edge of a diameter substantially equal to the diameter of said cylindrical surface, said flange having an outer surface forming an obtuse angle with the periphery of said base.

ERWIN F. LOWEKE.